(12) United States Patent
Jakubowski

(10) Patent No.: US 7,587,616 B2
(45) Date of Patent: Sep. 8, 2009

(54) SYSTEM AND METHOD OF ITERATIVE CODE OBFUSCATION

(75) Inventor: Mariusz H. Jakubowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 11/067,384

(22) Filed: Feb. 25, 2005

(65) Prior Publication Data

US 2006/0195703 A1  Aug. 31, 2006

(51) Int. Cl.
 *G06F 5/00* (2006.01)
(52) U.S. Cl. .................... 713/190; 713/189
(58) Field of Classification Search ............ 713/189, 713/190
 See application file for complete search history.

(56) References Cited

U.S. PATENT DOCUMENTS 6,668,325 B1 * 12/2003 Collberg et al. ............ 713/194

7,430,670 B1 * 9/2008 Horning et al. ............. 713/190

OTHER PUBLICATIONS

Hada, Zero-Knowledge and Code Obfuscation, 2000, Asiacrypt 2000, Springer-Verlag Berlin, pp. 443-457.*
Collberg et al., Watermarking, Tamper-Proofing, and Obfuscation—Tools for Software Protection, Aug. 2002, IEEE pp. 735-746.*
Collberg et al., Manufacturing Cheap, Resilient, and Stealthy Opaque Constructs, 1998, ACM POPL 98, pp. 184-196.*
Chen, Yuqun et al. "Oblivious Hashing: A Stealthy Software Integrity Verification Primitive", 17 pages.

* cited by examiner

*Primary Examiner*—Kambiz Zand
*Assistant Examiner*—William S Powers
(74) *Attorney, Agent, or Firm*—Lee & Hayes, PLLC

(57) ABSTRACT

A method of code obfuscation includes receiving a block of code. One or more obfuscation algorithms are then iteratively applied to the received code. The obfuscation algorithms are repeatedly applied, such that the output of the previous obfuscation algorithm provides the input to the next obfuscation algorithm. Each obfuscation algorithm may be a relatively simple code transform technique. The same obfuscation algorithm may be applied repeatedly or any combination of a plurality of obfuscation algorithms may be applied in any sequence. The cascading effects of applying rounds of obfuscation algorithms achieve obfuscated code exhibiting a significantly increased level of security that cannot be normally derived from the security of each individual algorithm.

24 Claims, 5 Drawing Sheets

SYSTEM AND METHOD OF ITERATIVE CODE OBFUSCATION

BACKGROUND

The open nature of conventional computing environments allows easy observation and modification of executing code, enabling individuals to reverse engineer, tamper with, or hack software. To address this problem, various techniques of code obfuscation endeavor to transform programs into forms difficult to understand and modify. However, there is no current obfuscation algorithm that is substantially secure and practical. The conventional code obfuscation techniques achieve marginally increased security at the expense of ever increasing obfuscated code size. The significantly increased size of the obfuscated code results in a notable decrease in the speed of execution thereof.

With the growing popularity of software and media distribution and the increasing economic investments made therein, the importance of protection techniques is expected to grow. Therefore, there is a need for improved code obfuscation techniques.

SUMMARY

Embodiments are directed toward systems and methods of iterative code obfuscation. In one embodiment, one or more obfuscation algorithms are iteratively applied to a block of code. The obfuscation algorithms are sequentially applied such that the output of the previous obfuscation algorithm is the input to the next obfuscation algorithm. The security of the obfuscated code is a function of the one or more obfuscation algorithms applied and the number of iterations thereof. The resulting security of iteratively obfuscated code may be substantially greater than obtained by conventional obfuscation algorithms.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to particular embodiments, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description, numerous specific details are set forth in order to provide a thorough understanding. However, it is understood that the present invention may be practiced without these specific details. In other instances, well-known methods, procedures, components, and circuits have not been described in detail as not to unnecessarily obscure aspects of the present invention.

Iterative code obfuscation is a procedure whereby one or more obfuscation algorithms are repeatedly applied to computer-executable code, with the output of the previous obfuscation algorithm providing the input to the next obfuscation algorithm. Each obfuscation algorithm may use a conventional obfuscation algorithm or any new obfuscation algorithm. Each obfuscation algorithm may apply a relatively simple code transformation technique, including methods not originally intended for obfuscation (e.g., translation from one programming language to another). The power of iterative code obfuscation is realized from iteratively applying a large number of such simple code transformation techniques to bootstrap security. Repeated interaction among the various transformations leads to complex code structure and operation that may not be deduced or explained easily by the action of each individual transformation. This is related to the concept of emergent behavior in the field of complex systems.

Figure 1:
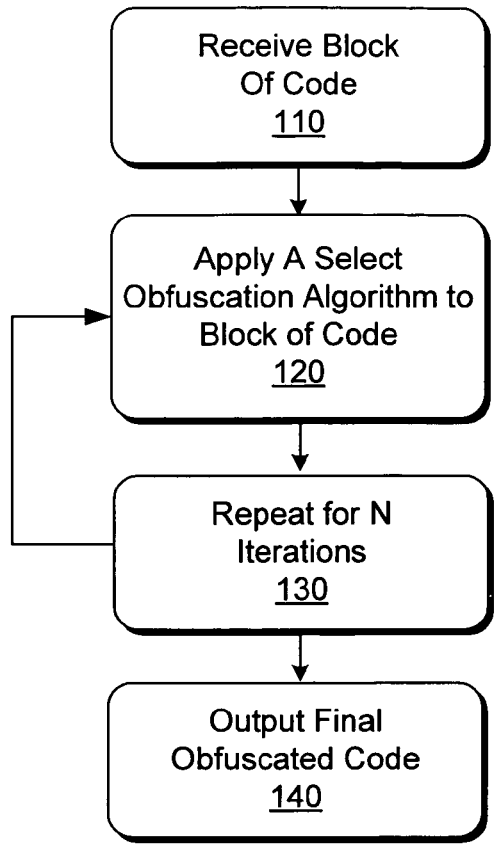
FIG. 1 shows a flow diagram of a method of code obfuscation, in accordance with one embodiment.

Referring to FIG. 1, a flow diagram of a method of code obfuscation is shown. It is appreciated that certain operations are described herein as constituting distinct processes performed in a certain order. Such implementations are exemplary and non-limiting. Certain processes described herein can be grouped together and performed in a single operation, divided into a plurality of processes, and/or certain processes can be performed in an order that differs from the order set forth in this disclosure. As depicted in. FIG. 1, the method begins with receipt of a block of code, at 110. The block of code may be of any form, such as source code, intermediate code, binary code, or the like. At 120, a select obfuscation algorithm is iteratively applied to the code block. At 130, the process at 120 is iteratively repeated. The application of obfuscation algorithms is repeated until a final obfuscated code is generated after a plurality (e.g., N rounds) of iterations. At 140, the final obfuscated code block may be output.

Iteratively applying obfuscation algorithms includes sequentially applying one or more obfuscation algorithms. Accordingly, successive iterations apply a code transformation technique to the obfuscated code generated by the previous iteration. Each code transform technique is adapted to obscure, hide, veil, blur, mask, disguise, muddle and/or cloud the process performed by the input code so as to confuse, bewilder, perplex, baffle and/or stupefy an entity trying to parse the code to determine its function.

In one implementation, the same obfuscation algorithm is applied in each iteration. In another implementation, the obfuscation algorithm applied in a given iteration is selected from one of a plurality of obfuscation algorithms such that the plurality of obfuscation algorithms is applied in a sequential or user-selected order. In another implementation, the obfuscation algorithm applied in a given iteration is selected from one of a plurality of obfuscation algorithms such that the plurality of obfuscation algorithms is applied in a random order. In yet another implementation, the obfuscation algorithm of each iteration is randomly selected from the plurality of obfuscation algorithms. In still another implementation, the obfuscation algorithm of each iteration is selected from the plurality of obfuscation algorithms at random, but according to a user-specified probability.

It is appreciated that a given obfuscation algorithm may perform a relatively simple code transform technique, which may be readily breakable. However, repeated application of one or more such relatively simple code transform techniques may achieve a practical implementation delivering a substantial level of security. Accordingly, a sufficient level of "confusion" and "diffusion" necessary for heuristic security arguments may be obtained as a function of the complexity of the one or more code transform techniques employed and the number of iterations thereof. Furthermore, in analogy with the field of complex systems, emergent code behavior and structure that may arise will not be easily deducible from the nature of each individual transform.

Figure 2:
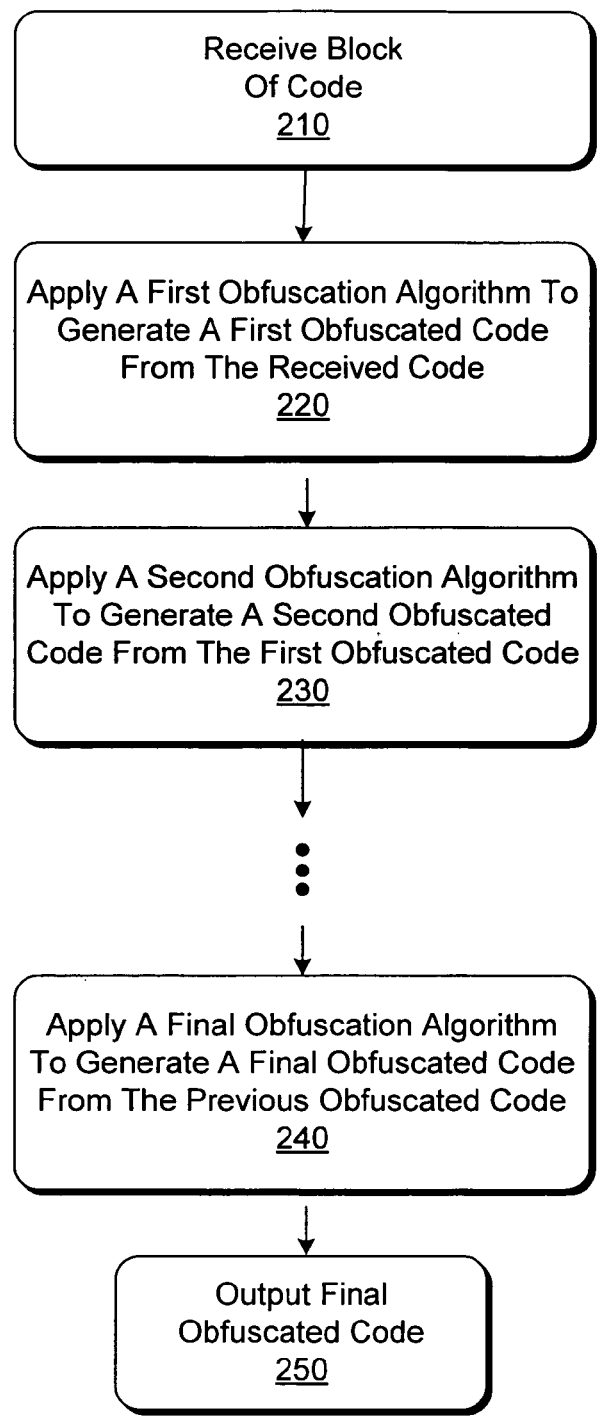
FIG. 2 shows a flow diagram of a method of code obfuscation, in accordance with an exemplary embodiment.

Referring now to FIG. 2, a flow diagram of a method of code obfuscation is shown. As depicted in FIG. 2, the method begins with receipt of a block of code, at 210. The block of code may be of any form, such as source code, intermediate code, binary code, or the like. At 220, a first obfuscation algorithm is applied to generate a first obfuscated code from the received block of code. At 230, a second obfuscation algorithm is applied to generate a second obfuscated code from the first obfuscated code. A select number of iterations of applying obfuscation algorithms are performed. Accordingly, the process continues until a final obfuscation algorithm is applied to generate a final obfuscated code from the previously generated obfuscated code, at 240. The final obfuscated code block may be output at 250.

It is appreciated that each iteration of code obfuscation 220, 230 . . . 240, may utilize the same obfuscation algorithm, or different obfuscation algorithms in any desired combination and/or in any sequence. A desired level of security may be achieved as a function of the complexity of the obfuscation algorithm or algorithms utilized and the number of iteration thereof. Thus, the more iterations that are applied the relatively simpler the obfuscation algorithms need be. Alternatively, more complex obfuscation algorithms may be utilized to reduce the number of iterations.

Figure 3:
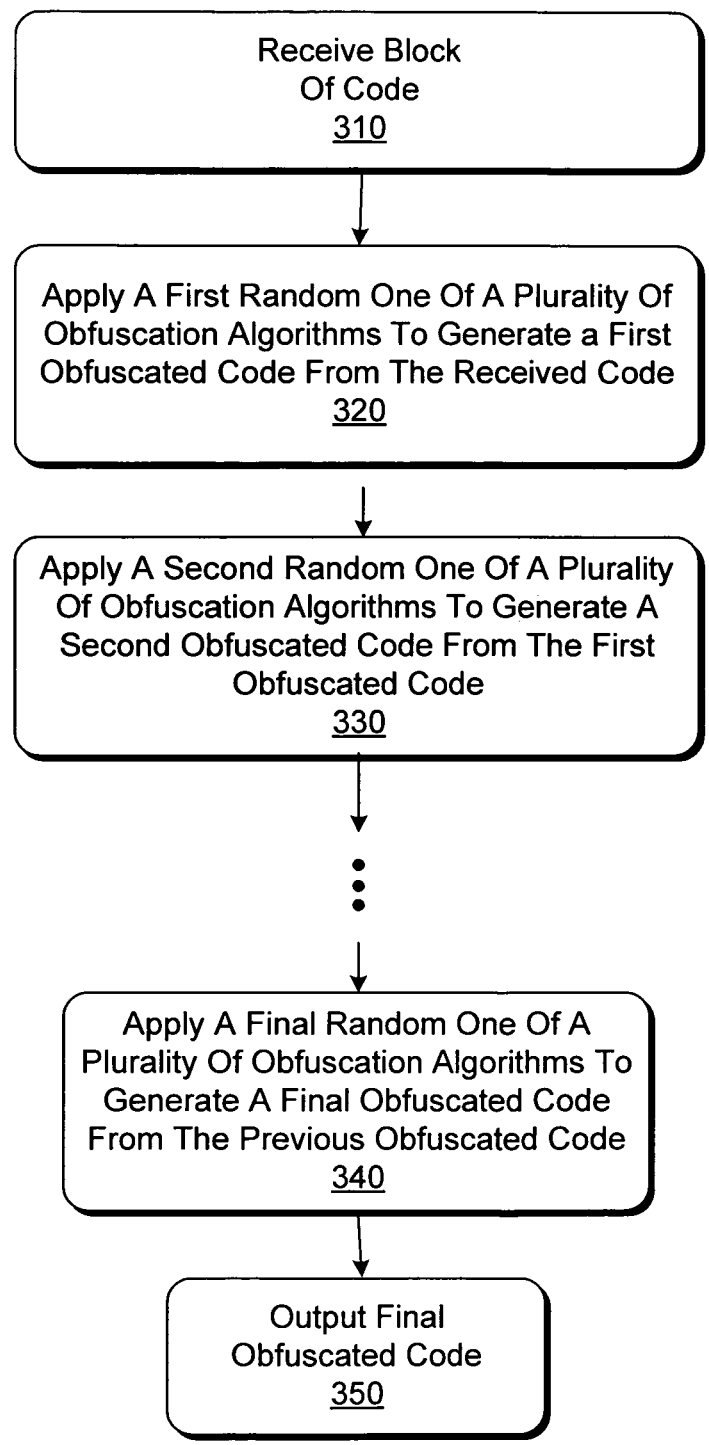
FIG. 3 shows a flow diagram of a method of code obfuscation, in accordance with another exemplary embodiment.

Referring now to FIG. 3, a flow diagram of a method of code obfuscation is shown. As depicted in FIG. 3, the method begins with receipt of a block of code, at 310. The block of code may be of any form, such as source code, intermediate code, binary code, or the like. At 320, a first obfuscation algorithm, randomly selected from a plurality of obfuscation algorithms, is applied to generate a first obfuscated code from the received block of code. At 330, a second obfuscation algorithm, randomly selected from the plurality of obfuscation algorithms, is applied to generate a second obfuscated code from the first obfuscated code. A select number of iterations of applying obfuscation algorithms are performed. Accordingly, the process continues until a final obfuscation algorithm, randomly selected from the plurality of obfuscation algorithms, is applied to generate a final obfuscated code from the previously generated obfuscated code, at 340. The final obfuscated code block may be output at 350.

Again it is appreciated that a desired level of security may be achieved as a function of the complexity of the obfuscation algorithm or algorithms utilized and the number of iterations thereof. Thus, the more iterations that are applied the relatively simpler the obfuscation algorithms need be. Alternatively, more complex obfuscation algorithms may be utilized to reduce the number of iterations.

Figure 4:
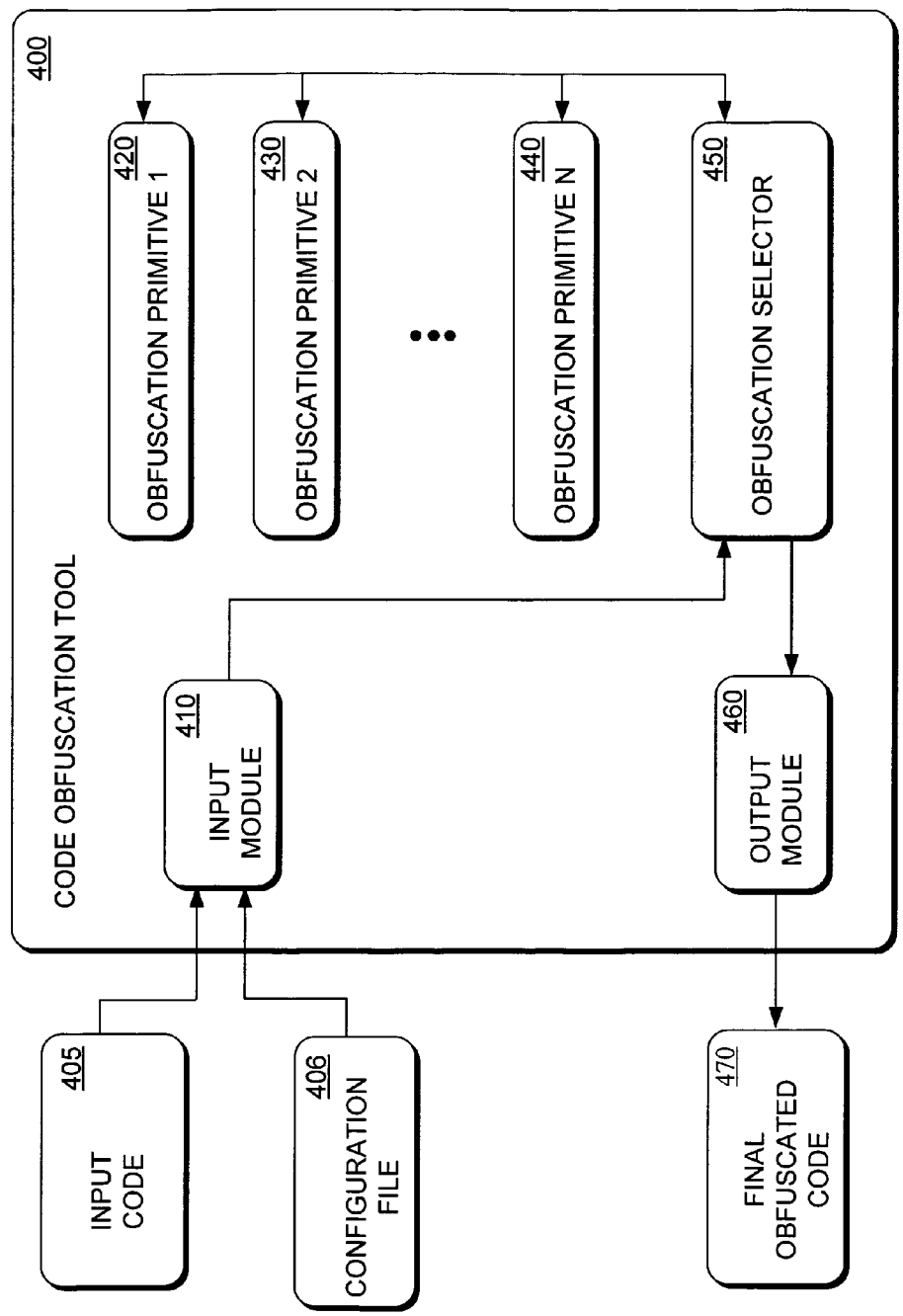
FIG. 4 shows a block diagram of a code obfuscation tool, in accordance with one embodiment.

Referring now to FIG. 4, a block diagram of a code obfuscation tool 400 is shown. As depicted in FIG. 4, the code obfuscation tool 400 includes an input module 410, a plurality of obfuscation primitives 420-440, an obfuscation selector module 450 and an output module 460. The input module 410, the plurality of obfuscation primitive modules 420-440 and the output module 460 are each communicatively coupled to the obfuscation selector module 450.

The input module 410 is adapted to receive input code 405. The input code 405 may be of any form, such as source code, intermediate code, binary code, or the like. Each obfuscation primitive module 420-440 is adapted to apply a given code transform technique. The obfuscation selector module 450 is adapted to iterate in a number of rounds one or more of the plurality of obfuscation primitive modules 420-440 over the input code 405 to generate an obfuscated code 470. The output module is adapted to issue the obfuscated code 470.

The input module 410 may also be adapted to receive a configuration file 406. In such implementations, the obfuscation selector module 450 may further be adapted to select the obfuscation primitives 420-440 as a function of one or more parameters specified in the configuration file 406. The parameters specified in the configuration file 406 may include the particular obfuscation primitives 420-440 to apply, the sequence of applying the particular obfuscation primitives 420-440 and/or the number of rounds of iteration.

Alternatively, the obfuscation selector module 450 may automatically estimate the security level achieved after each iteration. The security level may be estimated as a function of one or more metrics, such as branch complexity, data diffusion, code speed, code size and the like. The output module 460 may then output final obfuscated code once the desired security level has been achieved. The desired security level may be specified in the configuration file 406, which may include parameters like the maximum allowable performance impact in terms of code speed and size.

Accordingly, it is appreciated that the obfuscation selector module 450 may apply any given obfuscation primitive 420-440, any combination of obfuscation primitives 420-440 and/or any sequence of obfuscation primitives 420-440 of the tool 400 in accordance with parameters specified in the configuration file 406. As a result, the obfuscation selector module 450 may build an automated iterative code obfuscation process which may be customizable by a user.

It is appreciated that the obfuscation primitives 420-440 should be general enough to allow re-application over code already obfuscated. Each obfuscation primitive 420-440 should perform a basic operation which may be combined with others to form the more sophisticated operation of the iterative code obfuscation process. The number and types of rounds can be controlled by a user, via the configuration file 406. Certain values of the parameters contained in the configuration file 406 may be designated as standards to achieve certain obfuscation levels. However, code-size increase and decreases in the speed of execution should be considered when selecting the obfuscation primitives 420-440 and/or the number of rounds of iteration.

In one implementation, language features may be emulated in random, convoluted ways designed to achieve certain security properties. In addition, a language may be emulated in a virtual-machine (VM) system, not necessarily producing a full fledged VM, but just the code to manipulate a simulated execution environment to execute programs. By iterating such translation procedures across various language flavors and VMs, one can obtain an arbitrary amount of obfuscation. Furthermore, code size and speed of execution may be balanced with the desired level of obfuscation.

It is also appreciated that in iteratively obfuscated code blocks, one may observe characteristics that are not easily explained in terms of either the original code block or the simple nature of each obfuscation primitive. Accordingly, in one implementation, iterative code obfuscation may be utilized to create, model and/or study emergent program behavior.

Generally, any of the functions, processes or the like described with reference to the figures can be implemented using software, firmware, hardware (e.g., fixed logic circuitry), manual processing, or a combination of these implementations. The term "logic, "module" or "functionality" as used herein generally represents software, firmware, hardware, or any combination thereof. For instance, in the case of a software implementation, the term "logic," "module," or "functionality" represents program code that performs specified tasks when executed on a computing device or devices. The program code can be stored in one or more computer-readable media (e.g., computer memory). More generally, the illustrated separation of logic, modules and functionality into distinct units may reflect an actual physical grouping and allocation of such software, firmware and/or hardware, or can correspond to a conceptual allocation of different tasks performed by a single software program, firmware routine or hardware unit. The illustrated logic, modules and functionality can be located at a single site (e.g., as implemented by a computing device), or can be distributed over plural locations.

Figure 5:
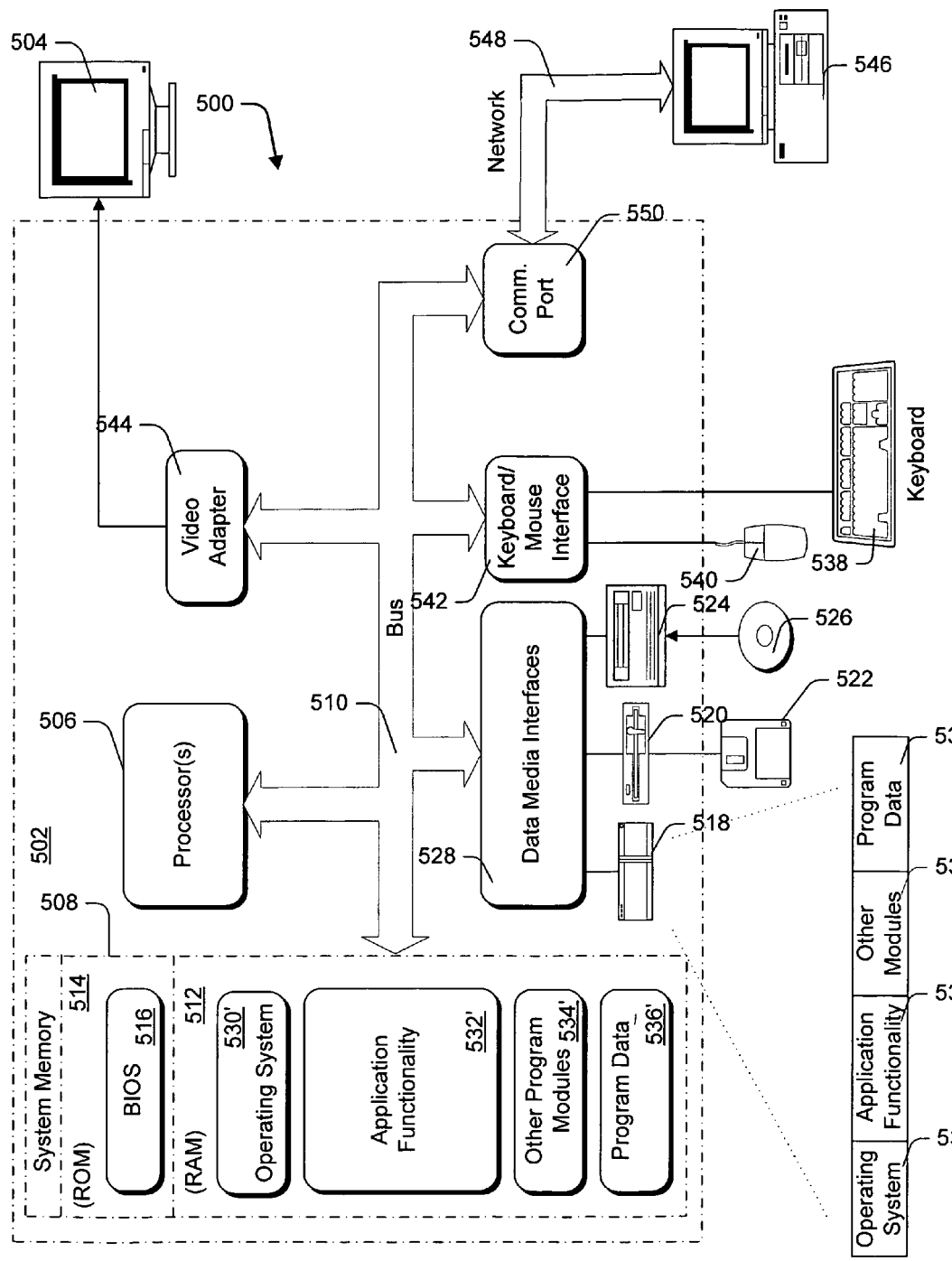
FIG. 5 shows a block diagram of an exemplary computing environment for providing a code obfuscation tool, in accordance with one embodiment.

Referring now to FIG. 5, a block diagram of an exemplary computing environment 500 for providing a code obfuscation tool is shown. As depicted in FIG. 5, the exemplary computing environment 500 may include a computing device 502. The computing device 502 may include a processing unit, one or more computer-readable media and one or more input/output devices communicatively coupled to each other.

More specifically, the processing unit may include one or more processors 506. The computer-readable medium may include system memory 508 and one or more types of mass storage devices. The system memory 508, mass storage devices and input/output device may be communicatively coupled to the processor 506 by one or more buses 510. The one or more buses 510 may be implemented using any kind of bus structure or combination of bus structures, including a memory bus or memory controller, a peripheral bus, an accelerated graphics port, and a processor or local bus using any of a variety of bus architectures. It is appreciated that the one or more buses 510 provide for the transmission of computer-readable instructions, data structures, program modules, and other data encoded in one or more modulated carrier waves. Accordingly, the one or more buses 510, may also be characterized as computer-readable mediums.

The system memory 508 may include both volatile and non-volatile memory, such as random access memory (RAM) 512, and read only memory (ROM) 514. The mass storage devices, which may also be characterized as mass storage type input/output devices, may include a variety of types of volatile and non-volatile media, each of which can be removable or non-removable. For example, the mass storage devices may include a hard disk drive 518 for reading from and writing to a non-removable, non-volatile magnetic media, a magnetic disk drive 520 for reading from and writing to a removable, non-volatile. magnetic disk 522 (e.g., a "floppy disk"), and an optical disk drive 524 for reading from and/or writing to a removable, non-volatile optical disk 526 such as a compact disk (CD), digital versatile disk (DVD), or other optical media. Although not shown, the one or more mass storage devices may also include other types of computer-readable medium, such as magnetic cassettes or other magnetic storage devices, flash memory cards, electrically erasable programmable read-only memory (EEPROM), or the like. The hard disk drive 518, magnetic disk drive 520, and optical disk drive 524 may each be connected to the system bus 510 by one or more data media interfaces 528. Alternatively, the hard disk drive 518, magnetic disk drive 520, and optical disk drive 524 may be coupled to the system bus 510 by a SCSI interface (not shown), or other coupling mechanism.

In addition to the mass storage type input/output devices described above, the input/output devices may include a display device 504, a keyboard 538, a pointing device 540 (e.g., a "mouse") and one or more communication ports 550. The input/output devices may also include speakers, microphone, printer, joystick, game pad, satellite dish, scanner, card reading devices, digital or video camera, or the like. The input/output devices may be coupled to the system bus 510 through any kind of input/output interface 542 and bus structures, such as a parallel port, serial port, game port, universal serial bus (USB) port, video adapter 544 or the like.

The computing environment 500 may further include one or more additional computing devices 546 communicatively coupled by one or more networks 548. Accordingly, the computing device 502 may operate in a networked environment using logical connections to one or more remote computing devices 546. The remote computing device 546 can comprise any kind of computer equipment, including personal computers, server computers, hand-held or laptop devices, multiprocessor systems, microprocessor-base systems, set top boxes, game consoles, programmable consumer electronics, network PCs, minicomputers, and mainframe computers. The remote computing devices 546 may include all of the features discussed above with respect to computing device 502, or some subset thereof. The networked environment may further be utilized to implement a distributed computing environment. In a distributed computing environment, computing resources can be physically dispersed throughout the environment.

Any type of network 548 can be used to couple the computing device 502 with one or more remote computing devices 546, such as a wide-area network (WAN), a local area network (LAN), and/or the like. The computing device 502 may be coupled to the network 548 via a communication port 550, such as a network interface card. The communication port may utilize broadband connectivity, modem connectivity, DSL connectivity, or other connection strategy. Although not illustrated, the computing environment 500 may also provide wireless communication functionality for connecting computing device 502 with remote computing devices 546 (e.g., via modulated radio signals, modulated infrared signals). It is appreciated that the one or more networks 548 provide for the transmission of computer-readable instructions, data structures, program modules, and other data encoded in one or more modulated carrier waves. Accordingly, the one or more networks 548 may also be characterized as computer-readable mediums.

Generally, one or more of the above-identified computer readable-mediums provide storage of computer-readable instructions, data structures, program modules, and other data for use by the computing device 502. For instance, one or more of the computer-readable medium may store the operating system 530, one or more application functionalities 532 (including functionality for implementing aspects of the code obfuscation methods and tool), other program modules 534, and program data 536. More specifically, the ROM 514 typically includes an input/output system (BIOS) 516 that contains the basic routines that help to transfer information between elements within computing device 502, such as during start-up. The RAM 512 typically contains the operating system 530', one or more applications functionalities 532', other program modules 534' and program data 536', in a form that can be quickly accessed by the processor 506. The content in the RAM is typically transferred to and from one or more of the mass storage devices (e.g., hard disk drive 518), for non-volatile storage thereof.

In one implementation, the operating system 530', in response to a command, may cause the code obfuscation tool to be loaded from a mass storage device (e.g., hard disk drive 518) into system memory 512. The operating system 530' may then cause the processor 506 to execute the input module of the code obfuscation tool. The input module may cause a block of code to be loaded into the system memory 508. The block of code may be of any form, such as source code, intermediate code, binary code or the like. The block of code is typically one that contains one or more functions and/or inputs that exercise security-sensitive code paths.

The input module may also cause a configuration file to be loaded into the system memory 508. The configuration file may contain an iteration count specifying the exact number of cycles of iteration. The configuration file may alternatively contain a range of possible iteration counts, such that the exact number of iterations may randomly be selected from within the given range. The configuration file may also contain one or more obfuscation primitive identifiers specifying the one or more obfuscation primitive modules to be applied. The configuration file may further specify the order of applying the obfuscation primitives and/or other operating parameters of the code obfuscation tool. For example, an additional operating parameter may specify the probability with which each primitive should be randomly applied.

In an exemplary implementation (illustrated using C pseudo code), the input module causes the following code block to be loaded into the system memory 508:

```
int f(int x)
{
    int y =x*10;
    y=y+5
    return y;
}
```

The exemplary code to be obfuscated performs the function of multiplying a variable x by ten and then adding five. The input module also loads an exemplary configuration file to be loaded into system memory 508. The exemplary configuration file specifies that an oblivious hashing algorithm be applied for two rounds of iteration.

The processor 506 may proceed with execution of the obfuscation selector module. Execution of the obfuscation selector module may invoke execution of one or more of the obfuscation primitive modules by the processor 506 in accordance with the parameters specified in the configuration file. Accordingly, one or more of the plurality of obfuscation primitive modules are sequentially applied. Each obfuscation primitive may apply a conventional obfuscation algorithm or any new obfuscation algorithm. The obfuscation code generated by the previous obfuscation primitive may be stored in the system memory 508 for processing by the processor 506 during execution of the next obfuscation primitive. Each iteration of an obfuscation primitive is adapted to further "confuse" and "diffuse" understanding of the function performed by the input block of code. This makes hacking, reverse engineering and the like difficult to automate (e.g., de-obfuscator tools) and/or prohibitively time-consuming.

In the exemplary implementation, execution of the obfuscation selector module, in conjunction with the parameters specified in the configuration file, causes an oblivious hashing algorithm to be iteratively applied to the input code for two rounds. The oblivious hashing algorithm is typically applied to assignment, control flow, and function argument programming constructs. Moreover, it is appreciated that hashing assignments and control flows captures most of the dynamic behavior of a program. Accordingly, after execution of a first iteration of the oblivious hashing algorithm by the processor 506, an intermediate obfuscated code may be generated and stored in the system memory 508. The intermediate obfuscation code may be as follows:

```
int OH1;
int g(int x)
{
    int y=x*10;
    OH1=update OH(OH1, y);
    y=y+5
    OH1=update OH(OH1, y);
    return y;
}
```

As can be seen, an additional computation (e.g., hashing code) is injected into the input code. The oblivious hashing variable (e.g., global variable OH1) is used to store the checksum (e.g., hash) value. The oblivious hashing variable is updated (e.g., calculated and verified) at the intermediate result (e.g., y=x*10) of the function, and then it is updated again after the final result is computed (e.g., y=y+5). Updating the oblivious hashing variable includes calculating or updating the checksum, based on the value of y, and comparing it to a previously calculated checksum (e.g., pre-stored) value for the function. The checksum comparison typically happens at some pre-selected points in the code, not necessarily every time the checksum is updated. Accordingly, the hashing code (e.g., checksum) implicitly computes a hash value from the on-going execution content (e.g., the variable y) of the input code.

After execution of a second iteration of the oblivious hashing algorithm, a final obfuscated code is generated by the processor 506 and stored in the system memory 508. The final obfuscation code may be as follows:

```
int OH1;
int OH2;
int h(int x)
{
    int y =x*10;
    OH1 = update OH(OH1, y);
    OH2 =update OH(OH2, y);
    OH2=update OH(OH2, OH1);
    y=y+5
    OH1=update OH(OH1, y);
    OH2=update OH(OH2, y);
    OH2=update OH(OH2, OH1);
    return y;
}
```

The second iteration of the oblivious hashing computes a checksum of the original intermediate result (e.g., y=x*10) and the final result (e.g., y=y+5). The second iteration of oblivious hashing also computes a checksum of the first iteration (e.g., OH1) calculated during the intermediate result and the final result of the original function. Effectively, the first oblivious hashing becomes just another function that the oblivious hashing algorithm is applied to in the second iteration. Thus, the oblivious hashing algorithm is repeatedly applied, with the output of the previous oblivious hashing process providing the input to the next oblivious hashing algorithm.

In another implementation, one of the obfuscation primitives invoked by the obfuscation selector module may apply a pointer conversion algorithm. In a pointer conversion code transform technique, a pointer to a variable is utilized instead of the variable itself. In another implementation, a noise code injection algorithm may be applied. In a noise code injection code transform technique, a useless calculation that is tightly integrated with the input code is inserted. In yet another implementation, a control-flow alteration algorithm may be applied. In a control-flow alteration code transform technique, branch- and if-statement constructs are modified.

It is appreciated that the relatively simple individual obfuscation primitive used in a given iteration does not produce a particularly secure obfuscated code when used alone. Instead, a desired level of security is achieved when a simple obfuscation primitive or plurality of obfuscation primitives are iteratively applied. The cascading effects of applying rounds of obfuscation primitives achieve significantly increased security as compared to conventional techniques, perhaps by orders of magnitude.

The obfuscation selector module may then cause the processor 506 to continue with execution of the output module of the obfuscation tool. The output module may cause the final obfuscated code to be stored in or transmitted on one or more of the computer-readable media. For example, the final obfuscated code may be stored in a mass storage device, such as the hard disk drive 518 for downloading by one or more remote computing devices 546. Alternatively or in addition, the final obfuscation code may be stored on an optical disk 526 for distribution. Accordingly, the computing device 502 advantageously may be utilized to implement an automated iterative code obfuscation tool, wherein the methods of obfuscation and how many iterations of obfuscation may be customizable by a user. Alternatively or in addition, the iterative code obfuscation may occur during the runtime of a program, performed either by the running program itself, an external tool that modifies the running program, or both. Applying iterative code obfuscation during the runtime of the program advantageously produces self-modifying and self-individualizing code.

It is appreciated that the illustrated operating environment 500 is only one example of a suitable operating environment and is not intended to suggest any limitation as to the scope of use or functionality of the invention. Other well-known computing systems, environments and/or configurations that may be suitable for use with the invention include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

Embodiments of the present invention advantageously provide a system and methods for iteratively obfuscating computer-executable code. Iterative obfuscation is a simple method to extend the strength of conventional and future code-obfuscation methods automatically and controllably.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of code obfuscation, implemented by a computing device, the method comprising:
   receiving a code block;
   iteratively applying a select obfuscation algorithm to the code block wherein for each iteration the select obfuscation algorithm is one of a plurality of obfuscation algorithms applied in a user-selected order that, when applied, outputs intermediate obfuscated code for further obfuscation by a subsequent non-final iteration, wherein at least two different obfuscation algorithms are applied and wherein one of the selected obfuscation algorithms comprises an oblivious hashing algorithm configured to insert a hashing variable into a code block that relies on a variable of the received code block that comprises a value determined at code execution; and
   outputting, from a final iteration, final obfuscated code.

2. The method according to claim 1, wherein for each iteration the select obfuscation algorithm is one of the plurality of obfuscation algorithms such that the plurality of obfuscation algorithms are applied in a sequential order.

3. The method according to claim 1, wherein for each iteration the select obfuscation algorithm is one of the plurality of obfuscation algorithms such that the plurality of obfuscation algorithms are applied in a random order.

4. The method according to claim 1, wherein for each iteration the select obfuscation algorithm is a random one of a plurality of obfuscation algorithms.

5. The method according to claim 4, wherein the randomness of each of the plurality of obfuscation algorithms is a function of a user-specified probability.

6. The method according to claim 1, wherein iteratively applying a select obfuscation algorithm selected from the plurality of obfuscation algorithms to the code block further comprises providing an output of a previous obfuscation algorithm as an input to a next obfuscation algorithm wherein the previous obfuscation algorithm and the next obfuscation algorithm differ or do not differ.

7. The method according to claim 1, wherein the select obfuscation algorithm is selected from a group consisting of an oblivious hashing algorithm, a pointer conversion algorithm, a noise code injection algorithm, and a control-flow alteration algorithm.

8. The method of claim 1 further comprising verifying the code block after applying the oblivious hashing algorithm by checking a hash value stored in a hashing variable wherein the hash value depends on the value of the variable of the received code block determined at code execution.

9. The method of claim 1 wherein the hashing variable further relies on another, different hashing variable.

10. A method of code obfuscation implemented by a computing device, the method comprising:
    receiving a block of code;
    applying a first obfuscation algorithm to the received block of code to generate a first obfuscated block of code; and
    applying a second, different obfuscation algorithm to the first obfuscated block of code to generate a second obfuscated block of code wherein the first obfuscation algorithm and the second obfuscation algorithm are applied in a user-selected order and wherein one of the applied obfuscation algorithms comprises an oblivious hashing algorithm configured to insert a hashing variable into a block of code that relies on a variable of the received block of code that comprises a value determined at code execution.

11. The method according to claim 10, further comprising successively applying one or more additional obfuscation algorithms, wherein each additional obfuscation algorithm is applied to a previous obfuscated block of code to generate a next obfuscated block of code.

12. The method according to claim 11, wherein successively applying one or more additional obfuscation algorithms is adapted to create emergent program behavior.

13. The method of claim 10 further comprising verifying a generated obfuscated block of code by checking a hash value stored in a hashing variable after applying the oblivious hashing algorithm wherein the hash value depends on the value of the variable of the received block of code determined at code execution.

14. The method of claim 10 wherein the hashing variable further relies on another, different hashing variable.

15. One or more computer-readable media having instructions that implement a code obfuscation tool, the instructions comprising:
an input module for receiving input code;
a plurality of obfuscation primitive modules that comprises an oblivious hashing primitive, wherein each obfuscation primitive applies a given code transform technique and wherein the oblivious hashing primitive applies an oblivious hashing code transform technique configured to insert a hashing variable into code that relies on a variable of received input code that comprises a value determined at code execution;
an obfuscation selector module, responsive to a user-selected order and coupled to the input module and the plurality of obfuscation primitive modules, for iterating in a plurality of rounds, according to the user-selected order, two or more of the plurality of obfuscation primitives over the input code to generate an obfuscated code; and
an output module, coupled to the obfuscation selector module, for issuing the obfuscated code.

16. The computer-readable media according to claim 15, wherein:
the input module further receives a configuration file comprising two or more obfuscation-primitive identifiers; and
the obfuscation selector module selects the two or more of the plurality of obfuscation primitives corresponding to the two or more obfuscation-primitive identifiers.

17. The computer-readable media according to claim 15, wherein:
the input module further receives a configuration file comprising an iteration count; and
the plurality of rounds of iteration applied by the obfuscation selector module corresponds to the iteration count.

18. The computer-readable media according to claim 15, wherein:
the input module further receives a configuration file comprising two or more obfuscation primitive identifiers and an iteration count;
the plurality of rounds of iteration applied by the obfuscation selector module corresponds to the iteration count; and
the obfuscation selector module selects the two or more of the plurality of obfuscation primitives corresponding to the two or more obfuscation primitive identifiers.

19. The computer-readable media according to claim 15, wherein the input code is in a source code form, an intermediate code form or a binary code form.

20. The computer-readable media according to claim 15, wherein the number of rounds of iteration is determined by the obfuscation selector module as a function of a desired security level.

21. The computer-readable media according to claim 15, wherein a level of security of the obfuscated code is a function of a complexity of each obfuscation primitive applied to the input code and the number of rounds of iteration.

22. The computer-readable media according to claim 15, wherein the obfuscation primitives and the number of rounds of iterating are adapted to create emergent program behavior.

23. The one or more computer-readable media of claim 15 further comprising instructions that implement a code obfuscation tool, the instructions comprising: a check module to verify a generated obfuscated block by checking a hash value stored in a hashing variable after applying the oblivious hashing code transform technique wherein the hash value depends on the value of the variable of the received input code determined at code execution.

24. The one or more computer-readable media of claim 15 wherein the hashing variable further relies on another, different hashing variable.

* * * * *